US012403337B2

(12) United States Patent
Plummer et al.

(10) Patent No.: US 12,403,337 B2
(45) Date of Patent: Sep. 2, 2025

(54) SCBA WITH ENHANCED EMERGENCY BREATHING SUPPORT SYSTEM

(71) Applicant: 3M INNOVATIVE PROPERTIES COMPANY, St. Paul, MN (US)

(72) Inventors: Darrill L. Plummer, Midland, NC (US); William E. Parson, Indian Trail, NC (US); William K. Shaffer, Monroe, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 745 days.

(21) Appl. No.: 17/844,223

(22) Filed: Jun. 20, 2022

(65) Prior Publication Data

US 2023/0001241 A1 Jan. 5, 2023

Related U.S. Application Data

(60) Provisional application No. 63/217,529, filed on Jul. 1, 2021.

(51) Int. Cl.
*A62B 9/04* (2006.01)
*A62B 7/02* (2006.01)

(52) U.S. Cl.
CPC . *A62B 9/04* (2013.01); *A62B 7/02* (2013.01)

(58) Field of Classification Search
CPC . A62B 9/00–04; A62B 7/00–02; A62B 18/00; A62B 18/02–08; A62B 18/10
See application file for complete search history.

(56) References Cited

U.S. PATENT DOCUMENTS 4,449,524 A * 5/1984 Gray ........................ A62B 9/00 128/205.24
6,095,142 A 8/2000 Giorgini et al.
6,394,091 B1 5/2002 Giorgini et al.
6,401,714 B1 * 6/2002 Giorgini .................. A62B 9/00 128/204.26
6,520,178 B1 * 2/2003 Baker .................... A62C 33/00 128/205.24
2016/0082295 A1 * 3/2016 Mele ........................ A62B 9/02 29/428

FOREIGN PATENT DOCUMENTS

WO 2021019348 A1 2/2021

OTHER PUBLICATIONS

FAQ: "3M™ Scott™ Air-Pak™ X3 Pro SCBA", A product of 3M, 2018, 6 pages.
Inspection & Cleaning Instructions: 3M™ Scott™ Air-Pak™ X3 PRO, A product of 3M, 56 pages.
Use Instructions: Dual EBSS Accessory Hose Assembly for Use With the Scott Air-Pak® 75, AIR-PAK® NxG, and Air-Pak® X3 Series, A product of 3M, NFPA-1981 2013 Edition, 16 pages.

* cited by examiner

*Primary Examiner* — Rachel T Sippel
*Assistant Examiner* — Jacqueline M Pinderski
(74) *Attorney, Agent, or Firm* — Kenneth B. Wood

(57) ABSTRACT

A reducer for a self-contained breathing apparatus (SCBA), comprising a primary air pathway with a primary metering valve and a secondary air pathway with a secondary metering valve. The reducer has an Emergency Breathing Support System (EBSS) outlet that is fluidly connected to a branch line of the secondary air pathway.

17 Claims, 5 Drawing Sheets

SCBA WITH ENHANCED EMERGENCY BREATHING SUPPORT SYSTEM

CROSS REFERENCE TO RELATED APPLICATIONS

This application claims priority from U.S. Provisional Application Ser. No. 63/217,529, filed Jul. 1, 2021, the disclosure of which is incorporated by reference in its/their entirety herein.

BACKGROUND

A self-contained breathing apparatus (SCBA) is an apparatus generally used to provide respiratory protection to a person that may be entering an objectionable, oxygen-deficient, and/or otherwise potentially unbreathable or toxic environment. Such apparatuses typically comprise at least one high-pressure air tank, and often include one or more devices designed to alert the user e.g. when the tank air has been depleted to a certain level.

SUMMARY

In broad summary, herein is disclosed a reducer for a self-contained breathing apparatus (SCBA). The reducer comprises a primary air pathway with a primary metering valve and a secondary air pathway with a secondary metering valve. The reducer comprises an Emergency Breathing Support System (EBSS) outlet that is fluidly connected to a branch line of the secondary air pathway. The reducer comprises a normally-closed low-tank-air transfer valve that, when closed, isolates the secondary air pathway of the reducer from direct connection with a delivery outlet of the reducer. In many embodiments, the reducer may also comprise a normally-closed automatic transfer valve that, when closed, isolates the branch line of the secondary air pathway from the delivery outlet of the reducer. Also disclosed is an SCBA using such a reducer, and methods of using such an SCBA and reducer.

These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. All figures and drawings are not to scale and are chosen for the purpose of illustrating different embodiments of the invention. The dimensions of various components are depicted in illustrative terms only, and no relationship between the dimensions of the various components should be inferred from the drawings. In particular, it is emphasized that the exemplary reducers as shown in FIGS. 2-5 are idealized representations that are arranged for ease of showing various items and functional relationships, and are not necessarily indicative of the exact manner in which such items may be arranged or configured in an actual product.

Although terms such as “first” and “second” may be used in this disclosure, it should be understood that those terms are used in their relative sense only unless otherwise noted. The term “configured to” and like terms is at least as restrictive as the term “adapted to”, and requires actual design intention to perform the specified function rather than mere capability of performing such a function. All references herein to numerical values (e.g. dimensions, ratios, and so on), unless otherwise noted, are understood to be calculable as average values derived from an appropriate number of measurements.

DETAILED DESCRIPTION

Figure 1:
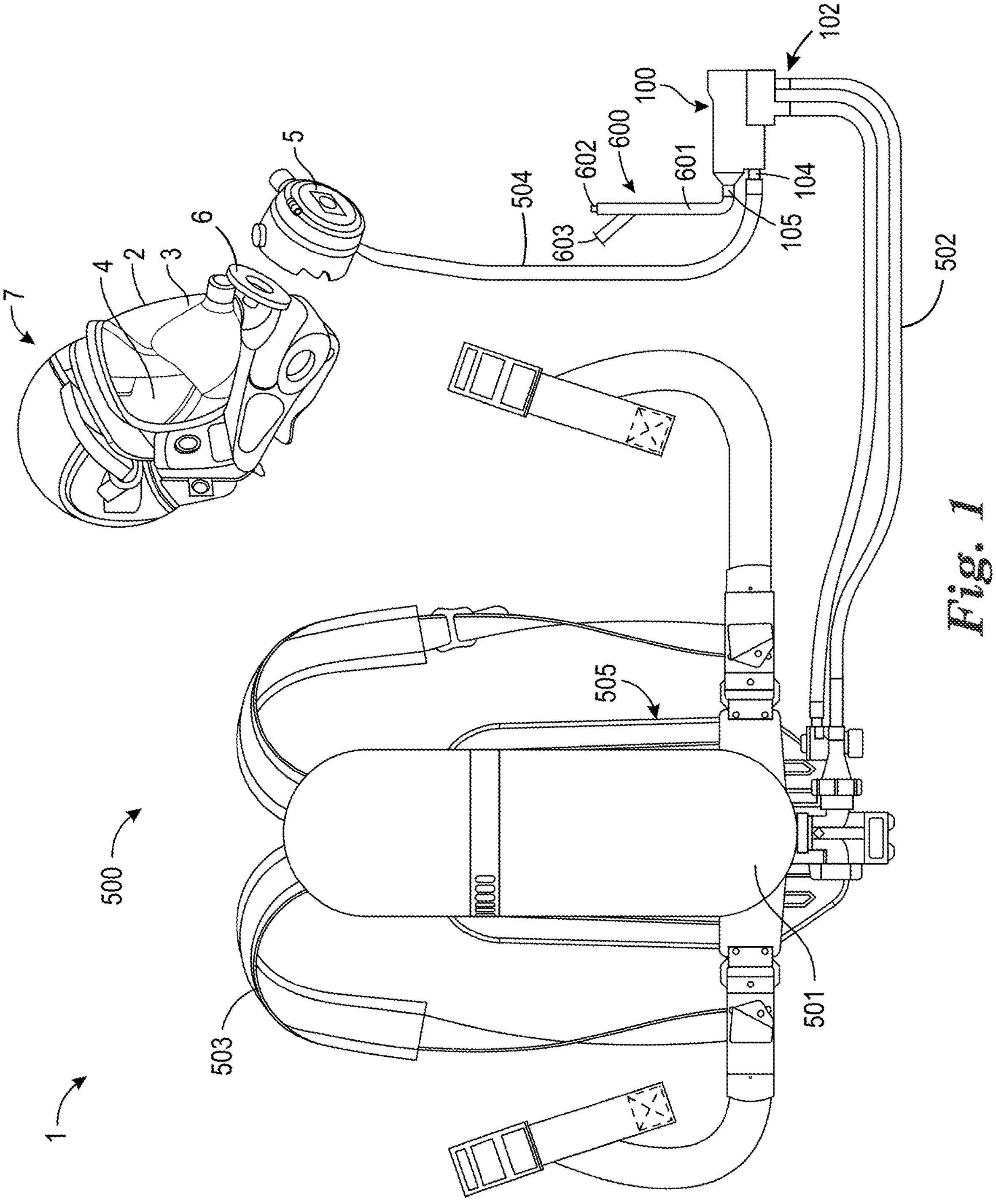
FIG. 1 is partially exploded view of an exemplary SCBA comprising an exemplary reducer.

Shown in FIG. 1 is an exemplary self-contained breathing apparatus (SCBA) 1 arranged to deliver breathable air to a human user of the apparatus. Apparatus 1 comprises one or more tanks (e.g. cylinders) 501 comprising a high-pressure breathable gas or gaseous mixture, most commonly compressed air (such tanks and their contents will be referred to respectively herein as air tanks and air, regardless of their specific contents). The air tank(s) 501 are supported on a harness 500 comprising e.g. various straps 503, support plates 505, buckles, and so on, by which the harness can be donned so that the air tank(s) can be comfortably supported e.g. on the back of the user.

SCBA 1 will comprise a facemask 7 and associated hoses and equipment so that breathable air can be supplied to the facemask. This equipment will include an in-line first-stage regulator 100 which will be referred to herein as a pressure reducer or, simply, a reducer. In brief, reducer 100 will receive high-pressure tank air through one or more hoses 502, and will reduce the pressure of the air from the tank pressure (which may be up to e.g. 5500 psi) to an intermediate pressure (which may range from e.g. 85 to 175 psi as discussed in detail later herein). The reducer then delivers the air at this intermediate pressure through a delivery outlet 104 (thus, this intermediate pressure at which the air is delivered through the delivery outlet will typically be referred to herein as an “outlet” pressure). The air is delivered through delivery outlet 104 into an intermediate hose 504, which conveys the air to a second-stage, mask-mounted regulator 5. Regulator 5 then further reduces the pressure of the air from the outlet pressure (which again, may be e.g. from 85 to 175 psi) to a suitable value (e.g. to near-atmospheric pressure) and delivers it to facemask 7.

It is emphasized that FIG. 1 is not to scale and that the items depicted therein are arranged so that various items and relationships can be easily seen; such arrangements may not correspond exactly to those used in actual products. For example, rather than a reducer 100 being spaced far away from an air tank 501 and being connected thereto by one or more hoses 502 that are fairly long as in FIG. 1, in an actual product the reducer 100 may be located rather close to the lower end of the air tank 501 with the hose(s) 502 being commensurately short.

A facemask 7 will typically comprise a head harness (unnumbered in these Figures) to hold the mask in place on the user's face, a generally forward-facing clear pane or lens 2 through which the user can see, and so on. Such a facemask 1 will define an interior volume (air space) 4 when fitted to the face of a human user. Such a facemask will typically comprise a face seal, often made of a compliant material such as e.g. molded silicone or the like, that ensures that the facemask is fitted to the face in a manner that minimizes or eliminates any air leaks. Such a facemask will often comprise a nosecup 3 that resides within interior volume 4 and that fits snugly about the nose and mouth of the user to deliver breathable air thereto. The nosecup will often be made of compliant materials in similar manner to the face seal.

A facemask 7 will comprise one or more couplers, connections or fittings 6 that allow regulator 5 to be mounted on, and fluidly connected to, the facemask, so that mask-mounted regulator 5 can deliver breathable air to the facemask. In some instances, such a facemask may comprise various other components, accessories, and so on (e.g. fittings to which voice amplifiers or radio direct interface devices can be attached, a mask-mounted thermal imaging camera, etc.). These and other ancillary items that may be present on a facemask will not be discussed in detail herein.

A mask-mounted regulator 5 is configured to reduce the pressure of the air (which, as noted above, may arrive at the regulator at a pressure of e.g. 85-175 psi) to a level suitable for breathing. In many embodiments, such a regulator may be an "on-demand" regulator that provides airflow in response to inhalations of the user. Typically, such a regulator may include a housing within which a diaphragm is disposed, the diaphragm being coupled to an actuating mechanism which opens and closes an inlet valve. The user's respiration creates a pressure differential that causes displacement of the diaphragm thereby controlling (e.g., opening and closing) the inlet valve. Air is supplied from hose 504 to regulator 5 e.g. via one or more entry ports; one or more exit ports can be provided so that the air, its pressure having been reduced to a suitable level, can exit the regulator and enter the facemask.

In further detail, in some embodiments such a regulator may rely on a demand valve comprising, among other items, a demand piston that, in the absence of inhaling by the user, is biased in a direction so that no air pathway is present. Upon inhalation by the user, the diaphragm may press on a demand valve lever that causes the demand piston to move to open an air pathway that allows air to flow into and through the regulator and into the facemask. When the user exhales (or stops inhaling), the force on the demand valve lever diminishes so that the demand piston moves so as to close the inhalation air pathway. User exhalation can also cause an exhalation valve to open so that the exhaled air can leave the regulator.

It will be apparent that the above passages merely describe one exemplary arrangement and that a mask-mounted regulator may comprise a variety of configurations. In many embodiments, such a regulator may be a positive-pressure, on-demand regulator in which breathing air is delivered to the mask during a user inhalation with the air delivery ceasing upon exhalation, but in which the regulator maintains the breathing air at a pressure that is slightly above the ambient pressure at all times. Various regulators of this and other types are described in detail e.g. in U.S. Pat. Nos. 4,345,592, 4,269,216, 6,095,142, and 6,394,091. Regulators are also described in U.S. Provisional Patent Application 62/879,279 and in the resulting International (PCT) Patent Application Publication WO 2021/019348, both of which are incorporated by reference in their entirety herein.

Reducer 100 as disclosed herein comprises a primary air pathway that is configured to deliver outlet air (to mask-mounted regulator 5) at a first, lower pressure. In ordinary use of reducer 100, this pressure will oscillate over a range as discussed later herein; therefore the term "nominal" pressure is used herein. The nominal pressure refers to the highest pressure that is encountered during these oscillations, this highest pressure typically being the set point to which the reducer is calibrated. Such a first, lower pressure may range over e.g. 85-110 psi; often the first, lower pressure of the primary air pathway may be set to a nominal set point of 100 psi and may oscillate e.g. from 110 psi down to 85 psi.

Reducer 100 further comprises a secondary air pathway that is configured to deliver outlet air to the mask-mounted regulator at a second pressure that is higher than the first pressure at which the primary air pathway would have delivered such air. Once again, this second, higher pressure will typically oscillate over a range. The second, higher pressure of the secondary air pathway may range over e.g. 145-175 psi; often, the second, higher pressure of the secondary air pathway may be set to a nominal set point of 160 psi and may oscillate e.g. from 175 psi down to 145 psi.

Figure 4:
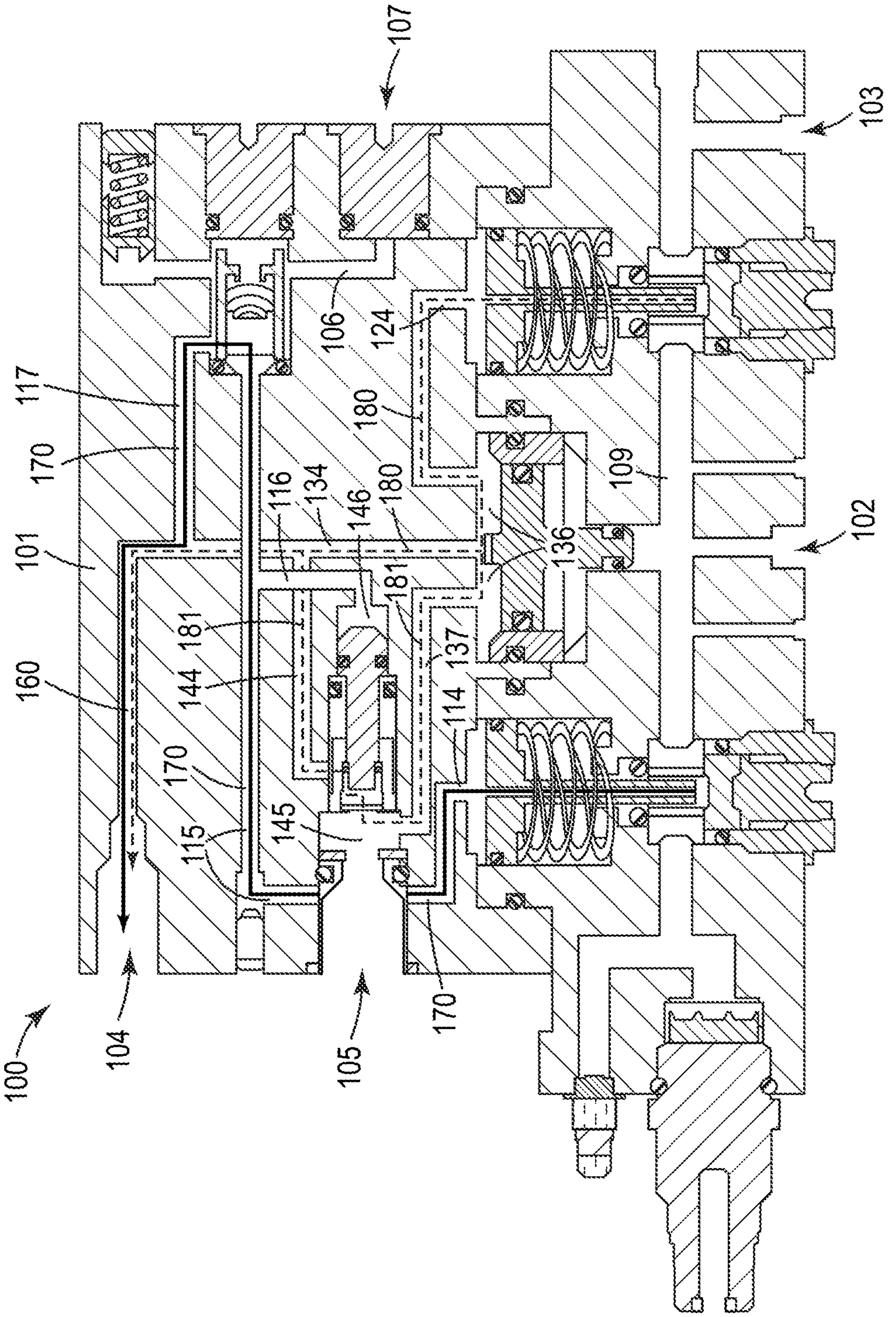
FIG. 4 is a schematic cross-sectional view of the exemplary reducer of FIG. 3, with a primary air pathway and a secondary air pathway denoted.

The secondary air pathway is independent of the first air pathway (although they may both deliver air to a common delivery outlet 104 as described later herein, and may share one or more air passages in common), so that air can be supplied through the secondary pathway rather than through the primary pathway. Primary air pathway 170, and secondary air pathway 180/181, are indicated in FIG. 4 and are discussed in detail later herein.

Reducer 100 is configured (e.g. with an low-tank-air transfer valve as described in detail later herein) so that if the tank pressure falls below a predetermined threshold, the reducer will switch from the primary air pathway to the secondary air pathway, thus providing redundancy. In some embodiments, reducer 100 may be configured (e.g. with an automatic transfer valve as described in detail later herein) so that in the event of an issue with the primary air pathway (e.g. an airflow interruption in the primary pathway), the reducer will switch from the primary air pathway to the secondary air pathway, irrespective of any depletion (or lack thereof) of the tank air. This can provide additional redundancy. Such a reducer 100 may be described as a dual-redundant reducer.

In many embodiments, an SCBA that is equipped with a redundant or dual-redundant reducer may comprise a pneumatic alert device that will be activated in the event that outlet air is supplied by the reducer to the mask-mounted regulator at a sufficiently high pressure (e.g. 145-175 psi). In this regard it is emphasized that, as discussed above, the outlet air that is supplied to the mask-mounted regulator by the secondary air pathway of the reducer will be at a higher pressure (e.g. 145-175 psi) than the outlet air that is supplied to the mask-mounted regulator by the primary air pathway of the reducer, which will be at a pressure of e.g. 85-110 psi. (Even the higher-pressure outlet air that is supplied by the secondary air pathway will still of course be much lower than the tank pressure, until the tank approaches depletion.) Such an alert device can provide an alert signal that the reducer has switched from the primary air pathway to the secondary air pathway and can thus inform the user that the pressure in the air tank has apparently dropped below a particular level (e.g., the air tank is down to 25% capacity), or there may have been a flow interruption or other issue with the primary air path of the reducer.

In brief summary, a reducer 100 as disclosed herein will comprise an Emergency Breathing Support System (EBSS) outlet 105 that is fluidly connected to the secondary air pathway of the reducer rather than to the primary air pathway of the reducer. Outlet 105 will be used as part of an Emergency Breathing Support System of the SCBA (specifically, a supply hose of an EBSS may be connected to outlet 105 as described later herein).

Ordinary artisans will be aware that an EBSS is a system whereby a first SCBA (referred to herein as a "donor" SCBA) can provide air to a second SCBA (referred to herein as a "recipient" SCBA). It will be appreciated that such an arrangement is only used in an emergency (e.g. in the case that a recipient SCBA is out of air and the user of that SCBA cannot immediately get to a location with breathable ambient air), and is only used for a short time since using the donor SCBA for "double-duty" in this manner will rapidly deplete the air tank of the donor SCBA. As discussed in detail later herein, configuring a reducer so that the EBSS utilizes the secondary air pathway rather than the primary air pathway, can enhance the performance of the EBSS.

Figure 2:
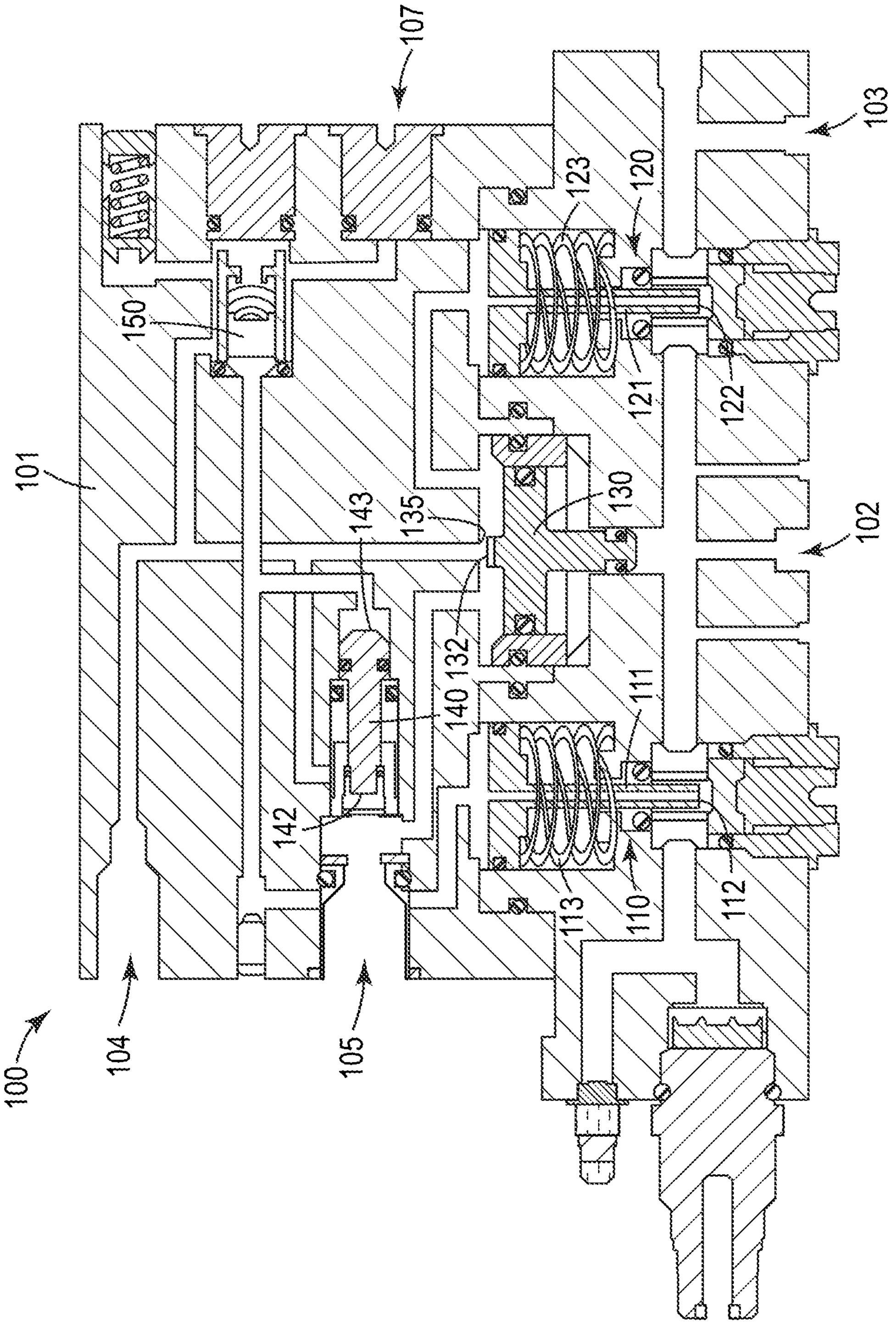
FIG. 2 is a schematic cross-sectional view of an exemplary reducer of an SCBA, with the identities and locations of various items (e.g. valves and components thereof) denoted.
Figure 3:
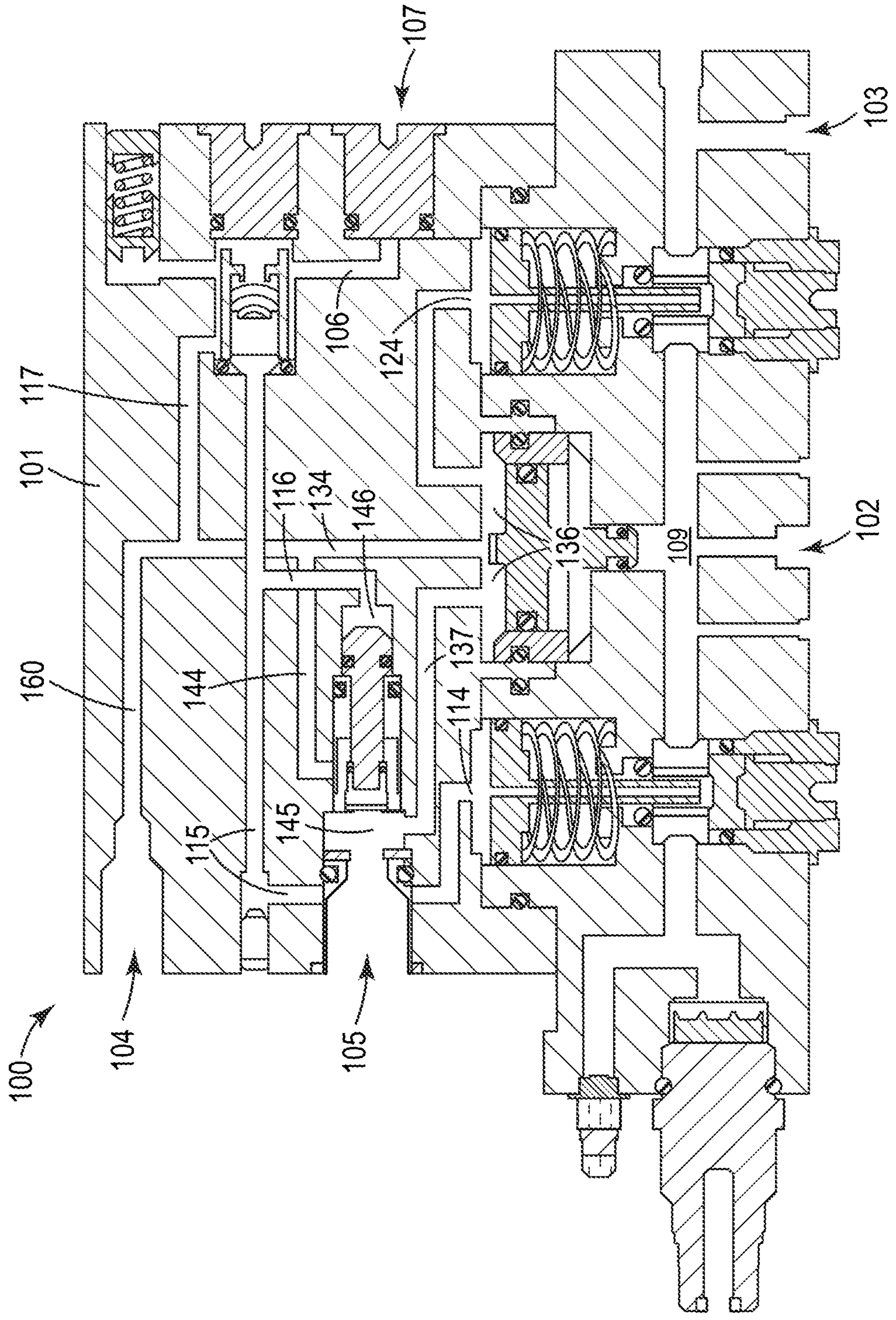
FIG. 3 is a schematic cross-sectional view of the exemplary reducer of FIG. 2, with the identities and locations of various air passages and chambers denoted.

The components and functioning of an exemplary redundant reducer 100 will now be discussed in detail so that a manner of using an EBSS that utilizes the secondary air pathway of the reducer rather than the primary air pathway can be fully appreciated. These components and functioning will be described with reference to FIGS. 2, 3, and 4. FIG. 2 indicates the identity and position of various functional items (e.g. valves and components thereof) of reducer 100. FIG. 3 is the same view as FIG. 2 but with various air passages of the reducer indicated. FIG. 4 then illustrates an exemplary primary air pathway 170 and an exemplary secondary air pathway 180/181.

It is emphasized that the exemplary reducer as shown in these Figures is an idealized, generic representation. It is further noted that these Figures are schematics, arranged so as to most easily depict various components of a three-dimensional reducer in a two-dimensional drawing, and are not necessarily indicative of the exact manner in which such items may be arranged or configured in an actual product.

Reducer 100 is configured to receive air from a high-pressure air tank e.g. through at least one high-pressure air hose 502. For this purpose, reducer 100 will comprise at least one inlet, which may be configured in any desired manner. In some embodiments, reducer 100 may comprise a first inlet 102 (which, in some embodiments, may comprise a quick-connect configuration e.g. with a latch assembly, locking pins and so on) and a second inlet 103 which may be configured to accept a hose e.g. in a non-quick-connect manner. (For purposes of illustration, FIGS. 2-4 depict an arrangement in which air is supplied through inlet 102, but air could instead be supplied through inlet 103.)

Reducer 100 further comprises a delivery outlet 104, by which air at an intermediate, outlet pressure is supplied to the mask-mounted respirator of the SCBA by way of an air hose 504. Reducer 100 also comprises an EBSS outlet 105 by which air can be supplied to a second, recipient SCBA. This air will similarly be at an intermediate pressure (far below the tank pressure), although under most circumstances the air supplied through EBSS outlet 105 will be at a somewhat higher pressure than the air supplied through delivery outlet 104, as will be made evident by the discussions below.

High-pressure air as introduced into reducer 100 e.g. through inlet 102 will reach a trunk line 109 as indicated in FIGS. 3 and 4, by which the air can be introduced into primary air pathway 170 and/or secondary air pathway 180/181 as indicated in FIG. 4. Primary air pathway 170 will be fluidly connected to delivery outlet 104 e.g. as indicated in FIG. 4 (noting that in some embodiments, this fluidic connection may be momentarily interrupted e.g. by one or more check valves or the like). The operation of primary air pathway 170 will be governed by a primary metering valve 110 as indicated in FIG. 2. Primary metering valve 110 comprises an elongate piston 111 that has an elongate through-passage (unnumbered) passing completely therethrough. When a lower end 112 of piston 111 is seated against a seating surface, the high pressure tank air in trunk line 109 will not be able to enter this passage within piston 111 and thus is stopped by primary metering valve 110. (Here and elsewhere, terms such as upper, lower and so on, are provided for convenience of description with reference to items as pictured in FIGS. 2-5, with the understanding that in actual use, such items may be in any orientation or geometric relationship depending e.g. on whether the user of the SCBA is standing vertical, leaning, lying down, etc.) A biasing spring 113 is provided that biases the valve body, and in particular piston 111, toward an upward, open position (as in FIGS. 2-4) in which tank air can flow into and through the through-passage of piston 111 to be admitted into air passage 114 and thus into primary air pathway 170. Valve 110 is configured to admit tank air into air passage 114 until the pressure in passage 114 (and primary air pathway 170) rises to a predetermined value which may be in the range of e.g. 85-110 psi. When that pressure is reached, the force of the air in passage 114 on the top surface of the valve body of valve 110, will overcome the biasing force of spring 113 and will cause the valve body and piston 111 to move downward from its open position to a closed position in which end 112 of piston 111 is seated against a seating surface. It is noted that in actual use, delivery outlet 104 will not be open as in FIGS. 2-5 but rather will be coupled to an air hose 504 that leads to a mask-mounted regulator as shown in FIG. 1. This will be a dead-end fluidic path (except when the user of the SCBA is breathing so as to actuate the mask-mounted regulator), so upon valve 110 bleeding tank air into primary air pathway 170, the pressure will build in pathway 170 rather than the air simply escaping through outlet 104 into the ambient environment.

Valve 110 will thus allow tank air into air passage 114 and into the rest of primary air pathway 170 until the pressure reaches the above-described predetermined value, and will shut off to prevent the pressure from going any higher. Since primary air pathway 170 is in fluidic communication with delivery outlet 104, this pressure will thus correspond to the above-described "outlet" (intermediate) pressure at which reducer 100 delivers air to the mask-mounted regulator. With regard to FIGS. 3 and 4, the primary air pathway 170 will follow air passages 114, 115, 117, and 160 to reach delivery outlet 104 (noting that the apparent interruption of passage 114 by EBSS port 105 in FIGS. 3 and 4 is an artifact of the two-dimensional figure; air passage 114 is not interrupted by EBSS port 105).

With these descriptions, it can be appreciated that in ordinary operation of SCBA 1 and reducer 100 thereof, primary metering valve 110 will admit tank air into the primary air pathway 170 until a desired pressure is reached, at which time valve 110 will close. As the user of the SCBA breathes, the air in primary air pathway 170 will be depleted thus the pressure in pathway 170 will decrease. At a certain point, primary metering valve 110 will reopen to let additional air into pathway 170. Valve 110 thus acts as a metering device to periodically bleed air into pathway 170 to bring the air pressure in pathway 170 back up to its nominal set point pressure.

The air pressure in pathway 170 will thus rise and fall between a maximum pressure at which valve 110 closes, and a minimum pressure at which valve 110 reopens. Because of these fluctuations, the pressure in air pathway 170 will be referred to as a "nominal" pressure. By way of a specific example, a primary air valve 110 may be set e.g. to a nominal pressure of 100 psi; in actual use, the pressure may vary between e.g. 110 psi and 85 psi, in consequence of the breathing of the user of the SCBA.

In ordinary use of SCBA 1 (e.g., with air tank 501 being full or nearly full of air), primary air pathway 170 will provide air to the mask-mounted regulator, with secondary air pathway 180 being dormant. Secondary air pathway 180 may take over in two circumstances as discussed below. One such circumstance will involve using a particular portion 181 of secondary air pathway 180 that is not used in the other circumstance. For convenience of description the secondary pathway will be referred to in general as pathway 180, or as pathway 180/181, in descriptions herein.

Tank air that is in trunk line 109 is able to reach secondary metering valve 120 which governs the admission of tank air into secondary air pathway 180. Secondary metering valve 120, in similar manner to primary metering valve, comprises an elongate piston 121 with an elongate through-passage, with a lower end 122 that, when seated against a seating surface, closes valve 120. Valve 120 also comprises a biasing spring 123 that biases valve 120 upward toward an open position (as in FIGS. 2-4) in which it can admit tank air into air passage 124 and into accessible portions of secondary air pathway 180. Secondary metering valve 120 will thus allow tank air to bleed into air passage 124 and into accessible portions of secondary air pathway 180 until the pressure reaches a predetermined nominal value, and will then shut to prevent the pressure from going any higher. This functioning is very similar to that of primary metering valve 110, except that secondary metering valve 120 is set to a higher pressure (e.g. 145-175 psi) in comparison to primary metering valve 110 (which, as noted above, may be set to e.g. 85-110 psi).

This being the case, secondary metering valve 120 will (e.g. upon the initial entry of tank air into trunk line 109) allow air into passage 124. However, this air will only be able to access portions of secondary air pathway 180. That is, other valves (described later in detail) 130 and 140 are present and are normally-closed valves. This being the case, there is no way for the air in secondary air pathway 180 to reach delivery outlet 104 or to reach any other outlet of reducer 100 (noting that although EBSS outlet 105 appears open in FIGS. 2-5, in actuality it will have an EBSS hose 601 coupled to it as shown in FIG. 1, which will provide a dead-end fluidic pathway as described later herein). This being the case, the pressure in air passage 124, and in the accessible regions of secondary air pathway 180/181, will build up to the predetermined nominal pressure at which point valve 120 will close. For example, if the predetermined nominal pressure setting is 160 psi, the pressure in these passages will build to that value and will then remain at that value, under static (no-flow) conditions.

Thus in ordinary operation of the reducer, primary metering valve 110 will periodically open and shut, replenishing the air in primary air pathway 170 as it is depleted by the user's breathing During this time, secondary metering valve 120 will remain shut due to the static pressure of the air in secondary air pathway 180, with the secondary air pathway thus being inactive.

Transformation of secondary air pathway 180 into active operation (i.e. with secondary metering valve 120 periodically opening and closing) may be triggered under certain conditions by the operation of a valve 130 as indicated in FIG. 2. Valve 130 will be referred to as a "low-tank-air transfer valve". Valve 130 is a normally-closed valve, meaning that it remains closed during ordinary operation of the SCBA unless caused to open by the tank pressure falling below a predetermined threshold. (Often, this threshold may correspond to the air tank having been depleted so as to have only e.g. 25%, or 37.5%, of the original air supply in the tank.) Valve 130 is shown in FIGS. 2-5 in the "open" position, in which it allows air that is in chamber 136 of secondary air pathway 180 to enter air passage 134. Normally, valve 130 is closed; that is, moved upward so that upper end 132 of valve 130 closes orifice 135 thus shutting off entry to air passage 134.

Valve 130 is configured so that in ordinary operation of the SCBA, the pressure of the air in trunk line 109 (which will typically be at a tank pressure of e.g. 2000-5500 psi) will hold valve 130 in its upward, closed position. If the tank pressure falls below a predetermined threshold, the pressure of the air in secondary air pathway 180 and thus in chamber 136 immediately above valve 130, will be sufficient to force valve 130 down into its open position. This may occur even though the tank pressure may still be far higher than the pressure in the secondary air pathway (for example, the tank pressure at 25% tank air remaining may be e.g. 1500 psi, while the secondary air may be at a pressure of e.g. 160 psi). As evident from FIG. 2, the surface area of the top of valve 130 that is exposed to the secondary air, can be made far greater than the surface area of the bottom of valve 130 that is exposed to the tank air, in order to facilitate such an arrangement.

Upon valve 130 moving from its normally-closed position into an open position, secondary air can now enter air passage 134 and can thus (via downstream passage 160) reach outlet 104. The secondary air pathway 180 can now take over the supplying of air to outlet 104 and thus to the mask-mounted regulator of the SCBA. The periodic depletion of air from the secondary air pathway 180 as the user breathes will now cause the pressure in pathway 180 to periodically drop, thus causing secondary metering valve 120 to periodically bleed more air into pathway 180, in an analogous manner as described above for primary metering valve 110. During these oscillations, the pressure in pathway 180 (and thus the "outlet" pressure) may vary e.g. between a nominal setpoint of 160 psi and a lower limit of 145 psi. (Thus, the pressure will remain in a range that causes primary metering valve 110 to remain closed, thus the primary air pathway 170 will be inactive, with the user's air being provided by the secondary air pathway 180.) This ability to switch over from a primary air pathway to a secondary air pathway e.g. in the event of depletion of the air tank thus provides the redundancy of operation that was noted previously (and can enable the issuing of a low-tank air alert, and so on).

The activation of the secondary air pathway 180/181 may also be triggered under certain conditions by the operation of a valve 140 as indicated in FIG. 2. Valve 140 will be referred to as a "automatic transfer valve" (the above-described low-tank-air transfer valve 130 will of course also open "automatically" upon the tank pressure dropping; these names are used merely for convenience of description). Valve 140 is a normally-closed valve, meaning that it remains closed during ordinary operation of the SCBA unless triggered to open by the pressure in primary air pathway 170 falling below a predetermined threshold relative to the pressure in secondary pathway 180/181. As discussed above, the pressure in the primary air pathway 170 will characteristically be lower than the pressure in the secondary air pathway 180; the opening of valve 140 is predicated upon this pressure difference increasing to a predetermined level. The opening of valve 140 will cause that secondary air pathway 180/181 is now fluidly connected to delivery outlet 104 of reducer 100, with the connection specifically being from a branch line air passage 137 of the secondary air pathway 180/181 (and thence through passage 144 to outlet 104) as described below.

These arrangements can be achieved by causing the position of automatic transfer valve 140 (and thus its status as open or closed) to be governed by a balance between the pressure in primary air pathway 170 and the pressure in secondary air pathway 180/181. To this end, a spur line 116 of primary air pathway 170 may lead to, and e.g. terminate at, a first, primary chamber 146 adjacent a first end 143 of valve 140. A branch line 137 of secondary air pathway 180 may lead to, and e.g. terminate at, a second, secondary chamber 145 adjacent a second end 142 of valve 140. The term "terminate" is applicable to branch line 137 and chamber 145 under ordinary operating conditions; that is, before the balance of pressure in the primary and secondary pathways has changed to cause valve 140 to move to an open position that allows flow so that chamber 145 is no longer a fluidic dead-end, as discussed below. It is further noted that EBSS port 105 as provided adjacent chamber 145 as newly disclosed herein, is fluidly connected to chamber 145 (also as newly disclosed herein) but will not permit flow therethrough under conditions of ordinary use, as discussed later herein. Therefore, the presence of EBSS port 105 does not deprive chamber 145 of being a fluidic dead-end termination of branch line 137 as characterized herein.

The above-described items will be configured so that under conditions of ordinary use, the force exerted by the static air in chamber 146 of primary air pathway 170 exceeds the force exerted by the static air in chamber 145 of secondary air pathway 180/181, so that valve 140 is held in its normally-closed position as in FIGS. 2-5. This condition will hold in spite of the fact that the pressure in the primary air pathway will be oscillating with the breathing of the user; the lower limit that the pressure falls to during these oscillations will not be low enough to cause valve 140 to open.

If the pressure in chamber 146 does fall low enough in comparison to the pressure in chamber 145 (which may happen e.g. if there is an interruption in the airflow in primary pathway 170, due to e.g. debris in the pathway), valve 140 will move to an open position (to the right, in these Figures). This will open an entry from chamber 145 into air passage 144 which now forms a portion of secondary air pathway 180/181. With this connection open, air can now flow through secondary air pathway 180/181; specifically, from chamber 136 into branch line 137, chamber 145, air passage 144, and air passage 134, which leads to delivery outlet 104. This can take place even as the low-tank-air transfer valve 130 remains closed so as to not permit airflow in secondary air pathway 180 by way of entry through orifice 135 into air passage 134.

Thus, if the opening of secondary air pathway 180/181 is triggered by automatic transfer valve 140, secondary air pathway 180/181 can deliver air to delivery outlet 104 and thus to the SCBA facemask, via a route through branch line 137 and so on. This can be compared to the previously-described route of secondary air pathway 180, from chamber 136 through orifice 135 and directly into air passage 134 and on to outlet 104, that is used if the opening of the secondary air pathway is triggered by low-tank-air transfer valve 130. Thus, the secondary air pathway comprises a "direct" route 180 that is governed by the state of low-tank-air transfer valve 130 and is provided by air passage 124, chamber 136, and air passage 134; and, the secondary air pathway also comprises an "indirect" route 180/181 that is governed by the state of automatic transfer valve 140 and is provided by air passage 124, chamber 136, branch line 137, air chamber 145, air passage 144, and air passage 134. Either route may be followed depending on the particular circumstances that caused the secondary air pathway to be activated.

It is further noted that in either case, air passage 134 of the secondary air pathway joins with air passage 117 of the primary air pathway to lead to a common exit passage 160 that leads to delivery outlet 104. Therefore, primary air pathway 170 and secondary air pathway(s) 180/181 may share at least one air passage in common; however, the functioning of the primary and secondary air pathways are largely independent.

In at least some embodiments a reducer 100 may comprise one or more check valves 150 as indicated e.g. in FIG. 2. In some embodiments, such a check valve 150 may prevent air in secondary pathway 180/181 from backflowing into certain air passages of primary air pathway 170, if this functionality is needed. Whether or not a check valve will be called on to perform this function may depend on the particular design, e.g. on whether primary air pathway 170 and secondary air pathway 180 are separated by the check valve, or are both on the same side of (e.g., are both upstream of) the check valve. In brief, any suitable design or arrangement of the primary and secondary air pathways, comprising one or more check valves as may be useful that particular design, may be used as desired.

The ability to switch from a primary air pathway to a secondary air pathway e.g. in the event of air tank depletion can provide redundancy as noted earlier herein. The additional ability to switch from a primary air pathway to a secondary air pathway e.g. in the event of a flow interruption in the primary air pathway can provide additional redundancy. In brief summary, such arrangements may rely on a normally-closed low-tank-air transfer valve 130 that, when closed, isolates secondary air pathway 180 from direct connection (through air passage 134) with delivery outlet 104 of reducer 100. In at least some embodiments, such arrangements may further rely on a normally-closed automatic transfer valve 140 that, when closed, isolates a branch line 137 of secondary air pathway 180/181 from delivery outlet 104. An exemplary arrangement that provides a primary air pathway 170, and a secondary air pathway comprising a "direct" pathway 180 and an "indirect" pathway 180/181, is depicted in FIG. 4 (noting again that both the primary and secondary air pathways will be fed from a common trunk line 109). Further details of these general types of dual-redundant reducers are described in U.S. Pat. No. 6,401,714 and (including discussions of transient phenomena that may occur upon initial entry of high-pressure tank air into the system, and functioning of a pneumatic alert device) in U.S. Provisional Patent Application 62/879,279 and in the resulting International (PCT) Patent Application Publication WO 2021/019348, all of which are incorporated by reference in their entirety herein.

As noted earlier herein, reducer 100 will comprise an Emergency Breathing Support System (EBSS) outlet 105 that is fluidly connected to secondary air pathway 180/181. Specifically, EBSS outlet 105 is fluidly connected (e.g. by way of chamber 145) to branch line 137 of secondary air pathway 180/181. By branch line is meant that air passage 137 branches off from chamber 136 of secondary air pathway 180/181 so as to be a separate passage from air passage 134 whose entry from chamber 136 is controlled by the open/closed status of low-tank-air transfer valve 130. Rather, branch line 137 will remain constantly in fluidic connection with chamber 136 regardless of the status of valve 130 (and, regardless of the open/closed status of automatic transfer valve 140). Further by a branch line is meant that line 137 leads to a fluidic dead-end at chamber 145 (notwithstanding that a dead-end spur passage may be provided by hoses of an EBSS as described later herein) under conditions of ordinary use; that is, when automatic transfer valve 140 is closed and no flow is present through branch line 137.

Figure 5:
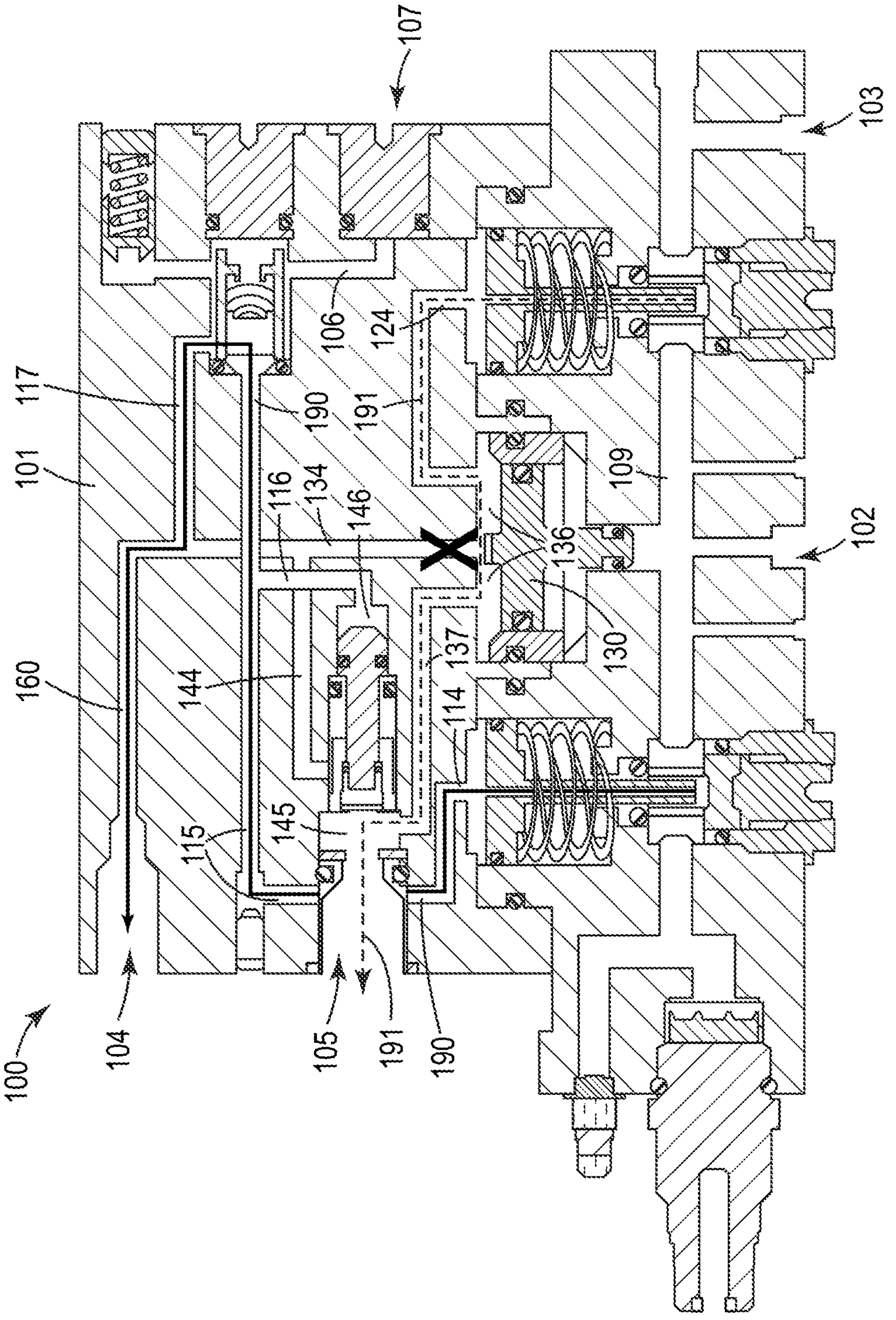
FIG. 5 is a schematic cross-sectional view of the exemplary reducer of FIG. 4, with a first air pathway for supplying air to a first, donor SCBA, and a second air pathway for supplying air to a second, recipient SCBA, indicated.

FIG. 5 provides an exemplary, idealized representation of an arrangement in which a reducer 100 provides a first air pathway 190 to a delivery outlet 104 to provide air for the donor SCBA, and provides a second pathway 191 to an EBSS outlet 105 to provide air for a recipient SCBA. (Both pathways will be fed from a common trunk line 109.) The first, donor air pathway 190 is the same as the previously-described primary air pathway 170. The second, recipient air pathway 191 includes air passage 124, branch line 137, and chamber 145 of the secondary air pathway 180/181.

The depicted scenario, in which low-tank-air transfer valve 130 is closed (as denoted by the block X in FIG. 5) so that the donor is provided air by the primary pathway rather than the secondary pathway, is expected to be present for the majority of occasions in which a donor SCBA is used to provide air to a recipient SCBA. That is, under most circumstances it is expected that a donor SCBA will have sufficient tank air for the donor's air to continue to be provided by the donor's primary air pathway e.g. for as long as it takes for the donor and recipient persons to move to a location in which ambient air can be safely breathed. However, if the persons both draw air from the shared (donor) air tank for long enough e.g. while moving to a safe location, the donor reducer may, if the tank is sufficiently depleted, switch the donor SCBA to rely on the secondary air pathway for a brief time. Under such circumstances both the donor and the recipient may receive air via the secondary air pathway of the donor's reducer for this brief time. (In this regard, it is again noted that the use of an EBSS to share air is only done in an emergency such as e.g. exhaustion of an air tank in an unsafe ambient atmosphere; in any such situation it will be paramount for the persons to move to a safe location as quickly as possible.)

The arrangements herein leverage the presence of branch line 137 of secondary air pathway 180/181. Heretofore, such a branch line has been used only for the purpose of supplying air to a chamber 145 so that the open/shut condition of an automatic transfer valve 140 can be controlled by the balance of the second-air-pathway pressure at chamber 145 and the first-air-pathway pressure at chamber 146; and, for acting as a portion of a secondary air pathway 180/181 upon the opening of valve 140. The present arrangements repurpose branch line 137 by providing a connection between chamber 145 and an EBSS outlet 105, so that the branch line can be used to provide air to a recipient SCBA (noting that chamber 145 will remain fluidly connected to EBSS outlet 105 at all times, regardless of whether automatic transfer valve 140 and low-tank-air transfer valve 130 are open or closed). This can be achieved without significantly affecting the functioning of the primary air pathway that continues to provide air to the donor SCBA (except that the tank air will of course be depleted more quickly). This can be done while preserving the ability of the donor reducer to switch over to delivery of air to the donor SCBA via the secondary air pathway rather than the first air pathway in the event of depletion of the donor air tank or a flow interruption in the donor reducer's primary air pathway.

An Emergency Breathing Support System (EBSS) may provided e.g. in the form of a module 600 that comprises a supply hose 601 and first and second donor hoses 602 and 603. Supply hose 601 may be connected to EBSS outlet 105 of reducer 100 by way of any suitable fitting or coupling that is coupled to EBSS outlet 105 of reducer 100 so that the supply hose 601 is fluidly connected to the EBSS outlet 105 of reducer 100 so as to be able to receive air therefrom. Typically, supply hose 601 will remain connected to EBSS outlet 105 in this manner at all times during use of the SCBA. First and second donor hoses 602 and 603 will be configured to receive donor air from supply hose 601 (e.g. via a manifold, if desired). During non-emergency use of SCBA 1 (i.e., when the SCBA is not being called on to act as a donor to provide air to a recipient SCBA) any such donor hose will not be connected to a recipient SCBA and will thus be a dead-end passage. (It will be appreciated that strictly speaking, during ordinary use the true fluidic dead end of secondary air pathway 180/181 may actually be at the end of a donor hose rather than at chamber 145 of reducer 100; however for the purposes herein, chamber 145 can be considered to be the effective dead end of pathway 180/181 with regard to the actuation of valve 140.)

Any such donor hose (e.g., first and second donor hoses 602 and 603) will be configured with suitable couplings that allow the donor hose to be fluidly connected to a hose of a recipient SCBA to enable delivery of donor air to the recipient SCBA in an emergency. In some embodiments, a donor hose may be configured to be connectable to an air hose of the recipient SCBA that is similar to air hose 504 of FIG. 1; that is, a hose that provides air to a mask-mounted regulator of the recipient SCBA. However, in some embodiments the donor hoses of the donor EBSS may be configured so that the connection can be made to a complementary hose of the recipient EBSS. Such an arrangement may comprise e.g. two donor hoses 602 and 603 that are arranged in parallel, with each being configured to receive air from the supply hose 601. In some embodiments, a first donor hose 602 may comprise a first, male coupling, and a second donor hose 603 may comprise a second, female coupling. This can provide that either the male or the female donor hose can be mated to a complementary female or male coupling of the EBSS unit of the recipient SCBA. Thus in some embodiments, a donor EBSS and recipient EBSS may be e.g. exactly the same structurally, with which unit is acting as the donor and which unit is the recipient being defined by which direction the air is being transferred.

In some embodiments, at least a portion of an EBSS module 600 (e.g., at least the first and second donor hoses 602 and 603) may reside in a container (e.g. a flexible pouch, made e.g. of cloth or canvas). Such a container may be e.g. located relatively close to reducer 100 with module 600 being connected to reducer 100 by supply hose 601. Often, the EBSS module and its container may be located toward the lower end of air tank 501 and/or may be supported in some manner by the SCBA harness. The container can be opened to remove the first and/or second donor hose from the container so that the first or second donor hose can be coupled to a receiver hose of a second, recipient SCBA (noting that since the remaining donor hose will be a fluidic dead-end, there is no need to connect the remaining donor hose to a recipient hose or to take any action with regard to the remaining donor hose). Any of these hoses may be made as long as desired e.g. in order to provide that two persons that are coupled to each other by way of an EBSS are able to move, e.g. to walk to safety, without difficulty.

The arrangements disclosed herein can provide that e.g. in an emergency situation requiring transfer of air from a donor SCBA to a recipient SCBA, the donor SCBA can continue to receive air from delivery outlet 104 via primary air pathway 170 of the donor reducer in the normal manner as in ordinary operation of the donor SCBA; while, concurrently, a recipient SCBA can receive air from EBSS outlet 105 of the donor reducer, via secondary air pathway 180/181. Such arrangements can allow two persons to breathe via airflow pathways of the donor's reducer that are largely independent of each other, e.g. so that the breathing of one person has a negligible effect on the breathing of the other person. Such arrangements offer a flexibility that is obviously not possible for a reducer that comprises only a single air pathway.

In this regard, it is emphasized that conventional arrangements in which e.g. two persons both draw air from a primary pathway of a reducer (some such arrangements may e.g. make use of an EBSS port at the location marked 107 in FIG. 3) are considered acceptable for short-term use e.g. in an emergency. However, the arrangements disclosed herein, in which the persons may draw from independent air pathways, may provide performance that is enhanced in at least some aspects. As noted above, under some conditions (e.g. if the pressure in the donor's air tank falls to the point that the donor's air switches over to the secondary air pathway as described earlier herein) both the donor and recipient may obtain air via the secondary pathway of the donor's reducer e.g. for a short time. However, it is expected that most uses of a herein-described EBSS will involve the use of two independent air pathways in the manner described above.

The disclosures herein describe an approach in which donor air is provided to a recipient SCBA, e.g. through the recipient's reducer or at a location downstream of the recipient's reducer (e.g. at a coupling provided on a hose that connects the recipient's reducer to the recipient's mask-mounted regulator). Such arrangements will provide air to the recipient at an "intermediate" pressure. That is, the donor's reducer will essentially be acting as the recipient's reducer, reducing the donor tank air to an intermediate pressure and metering this air into the recipient's mask-mounted regulator to replace air that is depleted by the breathing of the recipient. It will be appreciated that such arrangements differ from e.g. a Rapid Intervention Universal Air Coupling (RIC/UAC) system that allows a donor air tank and a recipient air tank to be equalized by the exchange of air at high, tank pressures.

It will be appreciated that in embodiments in which a donor EBSS is connected to a complementary recipient EBSS, the recipient will receive the donor air through a hose 601 that is connected to the recipient's reducer at an EBSS outlet 105 of the recipient's reducer. In other words, a recipient's reducer may be similar or identical to reducer 100 as shown in the Figures herein, except that the recipient reducer is operating "in reverse", with the donated air entering the recipient reducer through the EBSS "outlet" (which, in this case, will be serving as an inlet) 105 of the recipient reducer. The donated air can then travel from the "inlet" 105 to the delivery outlet 104 and thence to the recipient's mask-mounted regulator. The particular path that is traveled by the donated air within the recipient's reducer may vary depending on e.g. whether the recipient's low-tank-air transfer valve has been opened (thus opening a pathway along the recipient's air passages 137 and 134) or whether the recipient's automatic transfer valve has been opened (thus opening a pathway along the recipient's air passages 144 and 134). It will thus be appreciated that the disclosures herein encompass not merely a case in which a donor reducer is able to supply the donor with air through a primary air pathway and to supply a recipient with air through a secondary air pathway; they also encompass the concept of using a recipient's reducer "in reverse", to receive donated air through a secondary air pathway of the recipient's reducer.

It will be apparent to those skilled in the art that the specific exemplary embodiments, elements, structures, features, details, arrangements, configurations, etc., that are disclosed herein can be modified and/or combined in numerous ways. In summary, numerous variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A reducer for a self-contained breathing apparatus (SCBA), the reducer being configured to receive air from a high-pressure air tank at a tank pressure and to deliver the air through a delivery outlet of the reducer at an outlet pressure, and the reducer comprising:

a primary air pathway that is fluidly connected to the delivery outlet of the reducer and that comprises a primary metering valve configured to allow tank air into the primary air pathway until the pressure in the primary air pathway reaches a first, lower nominal pressure;

a secondary air pathway comprising a secondary metering valve configured to allow tank air into the secondary air pathway until the pressure in the secondary air pathway reaches a second, higher nominal pressure that is higher than the first, lower nominal pressure;

a normally-closed low-tank-air transfer valve that, when closed, isolates the secondary air pathway from direct connection with the delivery outlet of the reducer;

and, a normally-closed automatic transfer valve that, when closed, isolates a branch line of the secondary air pathway from the delivery outlet of the reducer;

wherein the reducer comprises an Emergency Breathing Support System (EBSS) outlet that is fluidly connected to the branch line of the secondary air pathway;

wherein a supply hose of an EBSS module of the SCBA is fluidly connected to the EBSS outlet of the reducer;

and, wherein the EBSS module comprises first and second donor hoses that are arranged in parallel to each other and that are each configured to receive air from the supply hose of the EBSS module, the first donor hose comprising a first, male coupling and the second donor hose comprising a second, female coupling.

2. The reducer of claim 1 wherein the normally-closed low-tank-air transfer valve is configured so that upon the tank pressure dropping to a predetermined level relative to the second, higher nominal pressure in the secondary air pathway, the low-tank-air transfer valve will open so that the secondary air pathway is directly fluidly connected to the delivery outlet of the reducer.

3. The reducer of claim 1 wherein the normally-closed automatic transfer valve is configured so that upon the first, lower nominal pressure in the primary air pathway dropping to a predetermined level relative to the second, higher nominal pressure in the secondary air pathway, the automatic transfer valve will open so that the secondary air pathway is fluidly connected to the delivery outlet of the reducer through the branch line of the secondary air pathway.

4. The reducer of claim 3 wherein the normally-closed automatic transfer valve is configured so that a spur line of the primary air pathway terminates at a first, primary chamber adjacent a first end of the automatic transfer valve and so that the branch line of the secondary air pathway terminates at a second, secondary chamber adjacent a second end of the automatic transfer valve.

5. The reducer of claim 4 wherein the automatic transfer valve is configured so that when the air in the primary air pathway is at the first, lower nominal pressure and the air in the secondary air pathway is at the second, higher nominal pressure, the force exerted by the air in the first, primary chamber of the primary air pathway exceeds the force exerted by the air in the second, secondary chamber of the secondary air pathway such that the normally-closed automatic transfer valve is held in the normally-closed automatic transfer valve's normally-closed position.

6. The reducer of claim 4 wherein the second, secondary chamber of the secondary air pathway is fluidly connected to the EBSS outlet of the reducer, regardless of whether the normally-closed automatic transfer valve is in the normally-closed automatic transfer valve's its normally-closed position or is open.

7. The reducer of claim 1 wherein the first, male coupling and the second, female coupling are both configured so that when the coupling is not coupled to a receiver hose of a separate SCBA, the coupling remains closed so that the EBSS module is a dead-end fluid pathway.

8. A self-contained breathing apparatus (SCBA), comprising:

a reducer configured to receive air from a high-pressure air tank at a tank pressure and to deliver the air through a delivery outlet of the reducer at an outlet pressure, the reducer comprising:

a primary air pathway that is fluidly connected to the delivery outlet of the reducer and that comprises a primary metering valve configured to allow tank air into the primary air pathway until the pressure in the primary air pathway reaches a first, lower nominal pressure;

a secondary air pathway comprising a secondary metering valve configured to allow tank air into the secondary air pathway until the pressure in the secondary air pathway reaches a second, higher nominal pressure that is higher than the first, lower nominal pressure;

a normally-closed low-tank-air transfer valve that, when closed, isolates the secondary air pathway from direct connection with the delivery outlet of the reducer;

and, a normally-closed automatic transfer valve that, when closed, isolates a branch line of the secondary air pathway from the delivery outlet of the reducer;

wherein the reducer comprises an Emergency Breathing Support System (EBSS) outlet that is fluidly connected to the branch line of the secondary air pathway;

and wherein the SCBA further comprises:

a facemask configured to be worn by a user, the facemask defining an interior region adjacent a face of the user when the facemask is donned by the user;

a regulator that is mounted on the facemask and is fluidly connected to the reducer and is configured to receive air delivered from the delivery outlet of the reducer and to admit the air into the interior region of the facemask at a breathing pressure that is lower than the outlet pressure;

the high-pressure air tank, the high-pressure air tank being fluidly connected to the reducer so as to supply the air to the reducer at the tank pressure;

and, a harness that is configured to be worn by the user and that supports the high-pressure air tank, wherein the SCBA further comprises an EBSS module comprising a supply hose that is fluidly connected to the EBSS outlet of the reducer and comprising first and second donor hoses that are arranged in parallel to each other and that are each configured to receive air from the supply hose of the EBSS module, the first donor hose comprising a first, male coupling and the second donor hose comprising a second, female coupling.

9. The SCBA of claim 8 wherein the supply hose of the EBSS module remains fluidly connected to the EBSS outlet of the reducer at all times during use of the SCBA, and wherein at least the first and second donor hoses of the EBSS module reside in a container that is configured to be opened to remove the first and/or second donor hose from the container so that the first or second donor hose is able to be coupled to a receiver hose of a second, recipient SCBA.

10. A method of using the SCBA of claim 8 as a first, donor SCBA to provide air to a second, recipient SCBA, the method comprising:

coupling the first or second donor hose of the EBSS module of the donor SCBA to a receiver hose of the recipient SCBA so that the air tank of the donor SCBA supplies air to both the donor SCBA and the recipient SCBA.

11. The method of claim 10 wherein the reducer of the donor SCBA delivers air to the EBSS outlet of the donor reducer and thus to the receiver hose of the recipient SCBA, through the branch line of secondary air pathway of the donor reducer and not through the primary air pathway of the donor reducer.

12. The method of claim 11 wherein as long as the tank pressure of the air tank of the donor SCBA remains above a predetermined level relative to the second, higher nominal pressure in the secondary air pathway of the donor reducer, the low-tank-air transfer valve of the donor reducer will remain closed so that the donor SCBA receives air via the primary air pathway of the donor reducer and the recipient SCBA receives air via the branch line of the secondary air pathway of the donor reducer.

13. The method of claim 12 wherein upon the tank pressure of the air tank of the donor SCBA dropping to the predetermined level relative to the second, higher nominal pressure in the secondary air pathway of the donor reducer, the low-tank-air transfer valve of the donor reducer will open so that the secondary air pathway of the donor reducer is directly fluidly connected to the delivery outlet of the donor reducer so that the donor SCBA receives air via the secondary air pathway of the donor reducer and the recipient SCBA receives air via the branch line of the secondary air pathway of the donor reducer.

14. The method of claim 11 wherein as long as the first, lower nominal pressure in the primary air pathway of the donor reducer remains above a predetermined level relative to the second, higher nominal pressure in the secondary air pathway of the donor reducer, the automatic transfer valve of the donor reducer will remain closed so that the donor SCBA receives air via the primary air pathway of the donor reducer and the recipient SCBA receives air via the branch line of the secondary air pathway of the donor reducer.

15. The method of claim 14 wherein upon the first, lower nominal pressure in the primary air pathway of the donor reducer dropping to a predetermined level relative to the second, higher nominal pressure in the secondary air pathway of the donor reducer, the automatic transfer valve of the donor reducer will open so that the branch line of the secondary air pathway of the donor reducer is fluidly connected to the delivery outlet of the donor reducer so that the donor SCBA receives air via the branch line of the secondary air pathway of the donor reducer and the recipient SCBA receives air via the branch line of the secondary air pathway of the donor reducer.

16. The method of claim 10 wherein the receiver hose of the recipient SCBA is connected to an air hose of the recipient SCBA, which air hose provides air to a mask-mounted regulator of the recipient SCBA.

17. The method of claim 10 wherein the receiver hose of the recipient SCBA is a receiver hose of an EBSS module of the recipient SCBA, the EBSS module of the recipient SCBA being complementary to the EBSS module of the donor SCBA, so that when the first or second donor hose of the EBSS module of the donor SCBA is coupled to the receiver hose of the EBSS module of the recipient SCBA, the EBSS outlet of the EBSS module of the donor SCBA is fluidly connected to an EBSS outlet of the EBSS module of the recipient SCBA, so that air that is delivered to the EBSS module of the recipient SCBA from the EBSS module of the donor SCBA, and flows through a secondary air pathway of the EBSS module of the recipient SCBA in order to reach a mask-mounted regulator of the recipient SCBA.

* * * * *